Patented July 7, 1931

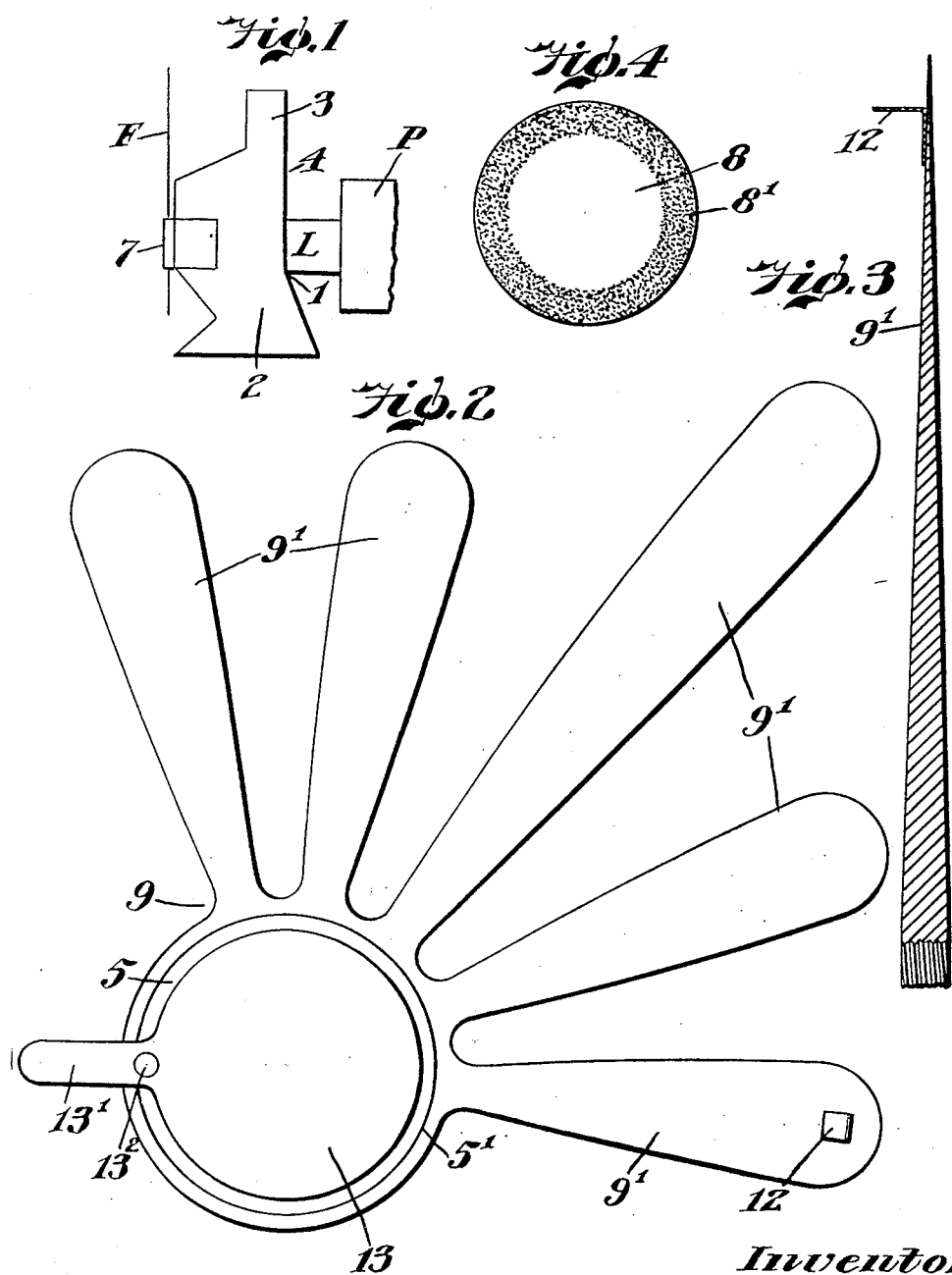

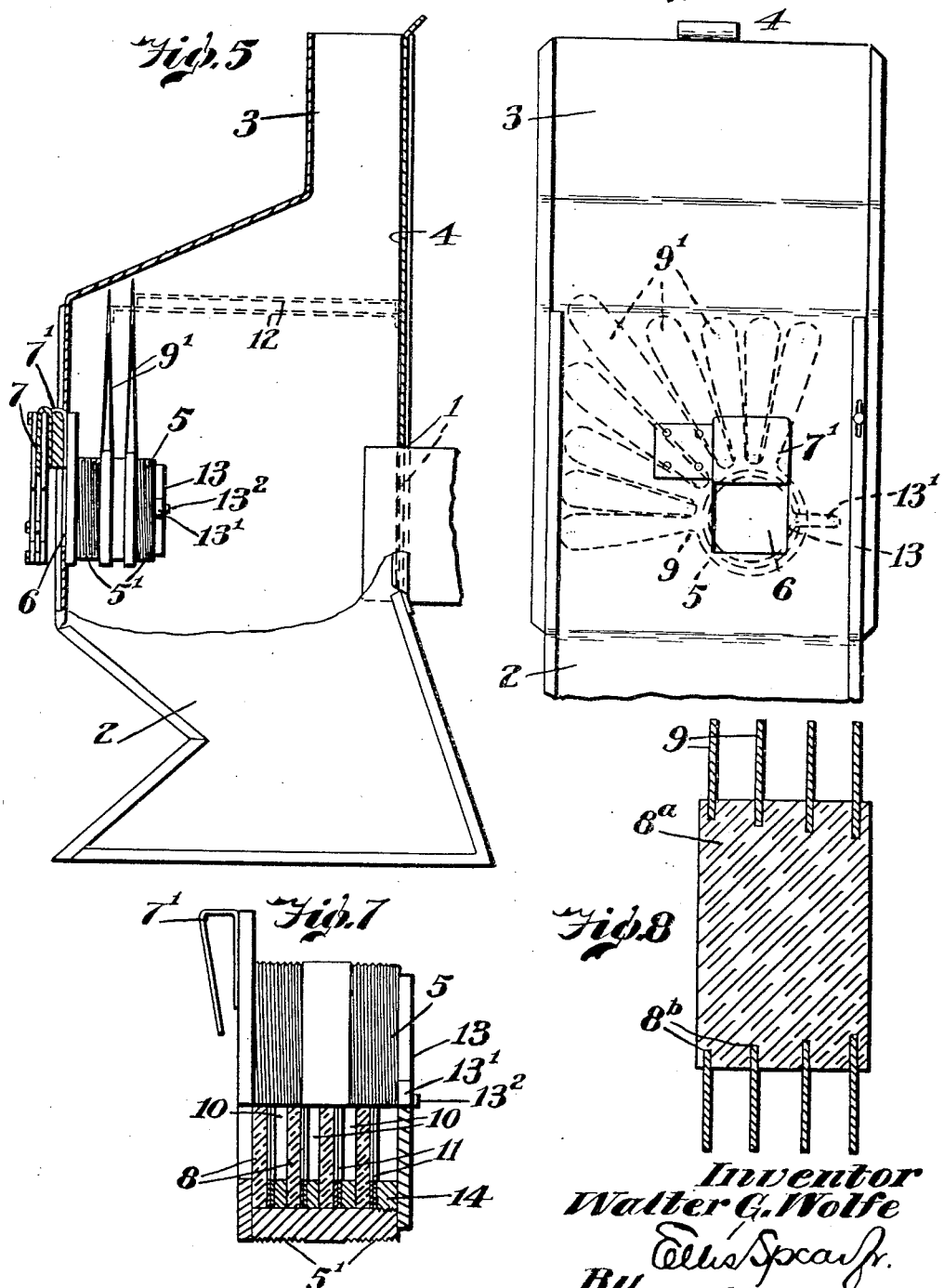

1,813,521

UNITED STATES PATENT OFFICE

WALTER G. WOLFE, OF GREENWOOD, MASSACHUSETTS, ASSIGNOR TO WILMOT R. EVANS, TRUSTEE, OF BOSTON, MASSACHUSETTS

THERMAL FILTER

Application filed February 15, 1929. Serial No. 340,210.

My present invention relates to what may be termed generally as thermal filtering or the absorption and dispersion of heat factors, as for example, in beams from high temperature sources of illumination without sacrificing the luminosity. As such light sources are characteristic problems, I will discuss my invention with particular reference to such uses, taking that of motion picture projection as one of outstanding and immediate practical importance. Many ways of filtering heat have been tried but all take out light. My invention reduces temperatures without cutting down on the illumination.

In the projection of motion pictures the two serious factors are the high temperature of the light source and the inflammable nature of the film. Between these two factors lies the fire hazard of the public movie and the terrible imminence of the consequences of such conflagration. The heat source has long been a serious problem in projection and particularly in modern movie projection such as the speaking movie. Where a porous screen is employed instead of the opaque screen the porosity makes it necessary to use much higher temperature light sources on account of the large percentage of light passing through the screen. To the solution of the problem my present invention is directed.

First as showing an apparatus basis I have illustrated in the accompanying drawings appliances which have demonstrated the results of my invention. These are merely illustrative of a large number of practical forms, but I show them on account of their simplicity and cheapness.

In the drawings:

Fig. 1 is an indication of a projection installation including an apparatus in accordance with my invention.

Fig. 2 is a rear view of the heat filter apparatus shown therein.

Fig. 3 a sectional view of a radiator plate.

Fig. 4 is a face view of a quartz member marginally treated to make it conductively attachable to the metallic radiator.

Fig. 5 is a central vertical section of an embodiment of my invention adapted to the reduction of the temperature in the projected beam of moving pictures and the like.

Fig. 6 is a front view of the casing.

Fig. 7 a partially sectioned view of one type of heat filter, and

Fig. 8 a section of a unitary type of filter.

In illustrating my invention I have indicated in Fig. 1 a projector P aligned with the rear aperture 1 of a casing 2. The casing 2 is provided with an upwardly disposed stack 3 for draft and is closed on its rear side by a slide 4 which may be removed for access to the interior.

The casing 2 constitutes a housing which contains the filter unit 5 and comprises an air chamber through which an air draft is introduced by the heat of the beam projected from the projector P. Aligned with the rear aperture 1 is a front aperture 6 over which is mounted the usual film guide 7 through which the film F runs. This film guide is usually held by a clip $7^1$ so as to be detachable and supports the guide 7 in alignment with the beam from the lens system L as it passes through the apertures 1 and 6.

A variety of thermal filtering mediums have been proposed but these as far as I am advised have been for the most part of fluid character, necessitating containers and other mechanical complications. They usually also cut down the illumination which of course was a fatal defect in projection. The whole purpose of the heat filter is to enable the use of high candle powers and if the light of the beam is to be cut down it is as well to reduce the candle power at the source in the first instance.

In my consideration of media for this purpose I noted the very high light transmission of quartz glass. Its absorption has been established as even lower than that of air. Quartz glass also has a very low coefficient of expansion and is therefore well adapted to high temperature work. However, as quartz glass has been noted to have a very low conductivity (.002) it would seem to be ill adapted to any thermal filtering system dependent on radiation, especially by convection. It may be here noted that on account of fire hazards forced drafts or blower systems are prohibited in ventilating or cooling projection apparatus so that the problem has carried a limitation of radiation and cooling. As a basis of dealing with the high heat temperature of such a medium as what I have termed quartz glass, my invention contemplates the utilization of a very highly conductive radiator so disposed with relation to the quartz filter system as to take off this heat very rapidly and disperse it. For this purpose copper seems to be most available as it has a coefficient .82, although silver has a conductivity of 1.10. The amount of heat taken from the beam has to be very considerable and for a high powered projection light source of a temperature of say 1200° F., the reduction has to be around 500° F. The high heat capacity and strong heat retention of the quartz filter imposes further complication in the matter of getting conductive union between the vitreous surface of the filter and the metallic radiator. Anything in the way of a bond of thermal reluctance prevents the radiator from taking off the heat from the filter at the rate required. Even a thin film of cement establishes a thermal barrier.

This difficulty I have overcome by establishing between the quartz glass and a highly conductive metal radiating system, a highly conductive bond over considerable areas of surface. Any film, layer or joint which is of low conductivity is fatal. I accomplish this by embodying in the vitreous surface of these areas a metallic film or deposit to which the corresponding areas of the metal radiating system can be bonded. I find that I can do this in two ways. First, I find that by introducing very finely powdered copper or like conductive material as a deposit or a cement, that I am able to obtain a highly conductive connection between the vitreous surface and the metal. I may deposit electrolytically or otherwise, metal, preferably silver, which in turn can be copper plated and then such surface united to copper plates included in the radiating system.

However, there has appeared still another factor of difficulty in operating with the quartz glass filter medium. This medium at normal or room temperatures, or at least in any radiating system was found not actually to have the expected effect of protecting the film. Investigation, however, led me to the further discovery that if the filter were heated up, it would then afford a very high degree of protection by absorption and radiation and would with a proper radiating system maintain itself at the desired temperature, which as I have above explained should under present operating conditions and requirements be below 800° F.

In the drawings I have indicated at 5 a filter unit connected as above described with a radiating system 9. Such a unit 5 may be variously constituted. In Figs. 2, 5 and 7, I have provided it as a metal casing 5 having a central bore of the desired beam diameter and as shown externally threaded as at $5^1$ on which can be screwed the plates 9 of the radiating system.

In the form shown in Fig. 7 I provide thin discs or plates 8 of clear quartz glass which are carefully polished to optical surface.

The margins and edges of these plates or discs 8 I then treat as at $8^1$ (see Fig. 4) by grinding or roughening the deposit of silver as above referred to, or by painting with a film of fine copper or the like. This can be laid on with Canada Balsam as a cementitious medium, or in a vehicle such as amyl-acetate.

Such surface can be bonded directly to copper rings 10 or in the assembly shown can be clamped in the casing preferably with very thin copper washers 11 interposed under pressure between the copper rings 10 and the edges of the plates 8 as by a threaded ring 14. That is to say, in such a structure it is not absolutely necessary that the metal and the glass be actually cemented or welded together but can be clamped as by the screw ring 14 sufficiently tightly to get conductivity between the surfaces as described.

As shown in Fig. 2 a radiating system such as 9 may be very simply formed by forming copper fins or blades $9^1$ which may be spread and bent across the casing to avoid thermal opposition. They are preferably twisted and staggered so as to get radiation clearance and get the full effect of any draft as through the stack 3. They may be supplemented by extra leaves or blades as indicated at 12.

The multiple layer filter has many advantages but has a certain light loss due to its plural surfaces. Where high power lighting is imperative and illumination losses are factors, I have provided a unitary filter member as shown in Fig. 8. In this I provide a single absorption unit $8^a$ of quartz glass. As shown this is cylindrical in form with its faces carefully polished. In connecting this with the radiating system 9 I proceed generally as indicated above to get my thermally conductive union.

I may accomplish this by cutting in the cylindrical sides of the unit a series of annular slots or kerfs as indicated at $8^b$. Preferably these are of progressive depth so as to get the greatest possible extent of surface union without interferring with the divergence of the beam as it passes through the filter. These slots I silver and then preferably copper plate and then force in the edges of the radiating plates 9 welding the edges of the plates to the metallized surface of the vitreous filter to get a complete bond. This may be accomplished by cementing as before described, but in this unitary type I give preference to the manner described.

I have previously referred to the performance of the quartz glass in such a system at different temperatures. My invention further contemplates convenient means for heating up the filter system before actual projection begins. This may be done simply as indicated in Figs. 2 and 5 by providing a priming shutter 13 operated in any convenient way as by a handle 13¹ pivoted at 13². By closing this shutter which is preferably of copper and turning on the beam, the whole filter system is heated up to the desired temperature. The shutter may then be withdrawn whereupon the quartz filter will be found to absorb heat from the beam maintaining itself at suitable temperature for which it is proportioned and thus protecting the film from the higher temperature of the light source.

Filters in accordance with my invention may be variously designed as to size and thickness and the radiating system proportioned to the size of the filter and to the temperature of the light source. With very simple apparatus, such as herein indicated, I am able to reduce the temperature of a beam from a source having a temperature of say 1200° F. to well below 800° F. which is at present considered to be a safety temperature. Obviously, the cooling can be carried much further, but I mention these figures as illustrative of ordinary practical present working conditions and as indicating that they may be met with extremely simple and inexpensive apparatus.

As to the degree of protection afforded the film, I can say that under the conditions above described I have increased the time at which a stationary film would flash from an instantaneous flash to a period of ten or more minutes. To state it on another basis, I can easily cut the thermal overcharge by about 50% as indicated.

In my discussion herein I have referred to my filtering medium as quartz glass intending thereby to include any kind of vitreous glass like bow or solid of fused quartz or having the elements, characteristics or properties of such material or substances. Preferably such material should be of optical clearness so as to have the least possible effect on the light beam, but for some purposes a colored medium might be desired or where requirements permitted absolute clarity might not be so important and some less clear medium might be used. I wish therefore to have it understood that I do not use the term quartz glass in any limiting sense, but merely as indicating a preference for that form of fused quartz produced with optical clarity and which I believe to be the most desirable medium at present available.

What I therefore claim and desire to secure by Letters Patent is:

1. In a thermal filter, a transparent vitreous plate disposed in the path of a beam, and a metallic radiating plate conductively attached to said transparent plate beyond the beam intercept by a cementitious film including a metallic conductor dispersed therein.

2. A thermal filter comprising a plurality of transparent vitreous plates adapted to be disposed in the path of a beam, and a plurality of thin metallic rediating plates conductively attached to said transparent plates beyond the beam intercept.

3. A thermal filter comprising a plurality of transparent vitreous plates adapted to be disposed in the path of a beam, and a plurality of thin metallic radiating plates conductively cemented to said transparent plates beyond the beam intercept.

4. In a heat absorbing apparatus for projectors and the like, a casing having draft openings therethrough and apertured for the projector beam, a thermal screen disposed in the line of the projector beam and comprising a transparent vitreous member, and a metallic radiator comprising thin fins conductively bonded to said vitreous member externally of the area of the beam intercept therewith.

5. In a heat absorbing apparatus for projectors and the like, a casing having draft openings therethrough and having aligned apertures for the path of a projector beam, a thermal screen disposed in the line of the projector beam, and comprising a sheet of quartz glass and a metallic radiator including thin fins conductively bonded to said plate externally of the area of the beam intercept therewith.

6. In a heat absorbing apparatus for projectors and the like, a casing having draft openings therethrough and apertured for the path of the projector beam, a thermal absorption screen disposed in the line of the projector beam and comprising a transparent member, and a metallic radiator bonded to said screen externally of the area of the beam intercept therewith, and disposed in the draft area of said casing.

7. A thermal filter unit comprising a plate of quartz glass or the like, and a metallic plate conductively attached thereto by contact surfaces including a cementitious binder and a finely divided metallic body dispersed therein.

8. In a thermal filter, a plate of quartz glass or the like, and a metallic plate conductively attached to the margins thereof by cementitious binder and a finely divided metallic body dispersed therein.

9. A thermal filter unit comprising a vitreous plate, and a metallic conductor attached thereto by contact surfaces including a cementitious binder and a finely divided metallic body dispersed therein.

10. A heat filter unit comprising a vitreous body having optical transmission surfaces and thermally conductive surfaces having metallic intimacy by metallic media in intimate physical contact therewith.

11. A heat filter unit comprising a vitreous body having optical transmission surfaces and a radiator system conductively united thereto by metallic media in intimate physical contact therewith externally of the optical surfaces.

12. In a light filter, a light transmitting medium of high thermal reluctance, a metallic radiating system, and an extended conductive surface union including a finely dispersed metallic bond intimately associated with the surface of the vitreous medium.

13. In a light filter, a vitreous light transmitting medium of high thermal reluctance, a metallic radiating system comprising a plurality of staggered radial fins, and an extended conductive surface union between said metallic system including a finely dispersed metallic bond intimately associated with the surface of the vitreous medium.

14. In a thermal filter for projectors having a high intensity light source for the beam, a light transmitting medium comprising a body of quartz glass, radiating elements conductively connected therewith, and means thermally associable with the light transmitting medium for accelerating its primary heat absorption from the beam.

In testimony whereof I affix my signature.

WALTER G. WOLFE.